Feb. 27, 1934.  L. W. STETTNER  1,948,737
HEATING TORCH
Filed Dec. 2, 1929
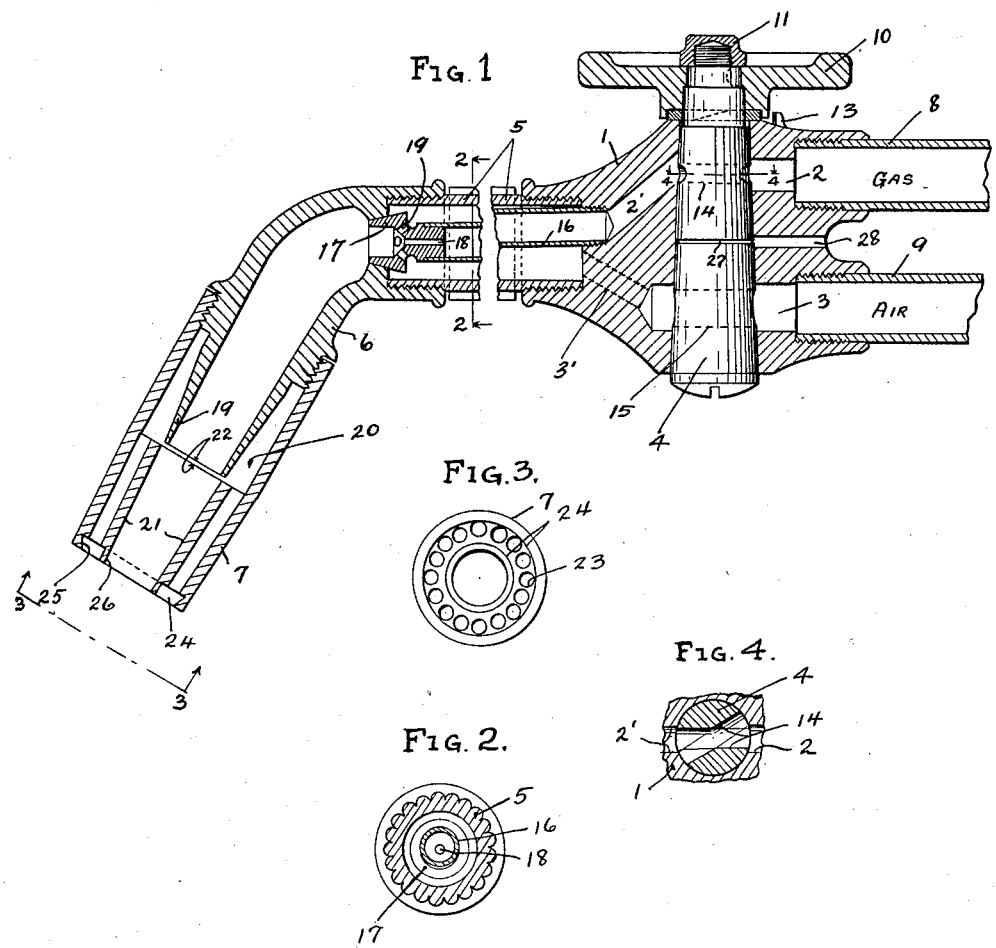
INVENTOR.
LUDWIG W. STETTNER
BY
ATTORNEYS.

Patented Feb. 27, 1934

1,948,737

UNITED STATES PATENT OFFICE 1,948,737

HEATING TORCH

Ludwig W. Stettner, Oakland, Calif., assignor to Victor Welding Equipment Co., San Francisco, Calif., a corporation of Delaware Application December 2, 1929. Serial No. 411,022

8 Claims. (Cl. 158—27.4)

This invention relates to heating and brazing torches and has for its objects improvements in the general construction of such torches whereby efficiency and reliability are increased and a torch which will be better adapted for use with natural gas than prior torches of this kind though not limited to any particular kind of gaseous fuels.

In the drawing accompanying this application Fig. 1 is a longitudinal central section of my improved torch with the central shank broken away so as to reduce the drawing in length to suit the sheet.

Fig. 2 is a cross section of the torch as seen from the line 2—2 of Fig. 1.

Fig. 3 is an end view of the burner tip as seen from the line 3—3 of Fig. 1.

Fig. 4 is a cross section of the plug valve of the torch as seen from the line 4—4 of Fig. 1.

The chief elements of the torch are a body 1 with gas and air inlet passages 2, 3, respectively, controlled by plug valve 4, a tubular shank 5 leading the air to a nozzle or mixing chamber 6 fitted at its end with a burner tip 7.

Passages 2, 3 connect with pipe nipples 8, 9 which in turn connect to hose lines, not shown, for bringing the gaseous elements to the torch, such as any fuel gas and air or oxygen, passage 2 being for the fuel gas while passage 3 is for the oxygen or air. This passage is preferably wider than it is high as viewed in Fig. 1 or else double so as to get greater area than a single small round hole would give in the position shown.

The plug 4 is tapered, fitted with a handwheel 10 keyed to its small end and locked in place by a nut 11 at the outer end of the valve, while a split spring washer 12 positioned between the recessed hub of the handwheel and valve body insures tight resilient seating of the plug yet prevents accidental longitudinal displacement of the plug, while a suitable stop 13 on the valve body cooperates with a stop (not shown) on the handwheel to designate the off position of the plug.

The plug is ported to match the gas passages as at 14, 15, the port 15 being simply a round hole, but port 14 is elongated or slotted in a direction around the plug so that while the air may be varied by port 15 turning partially off, port 14 will deliver the same quantity of fuel gas over quite a distance of turning of the plug. Port 14 is easily formed by drilling two holes in crossing relation as shown in Fig. 4 and filing to slot form.

After passing through the plug ports the gases are led through converging passages 2', 3', the latter preferably being two drilled holes like 3' side by side so as to have an area equal to the valve port 15. Passages 3' lead directly into the interior of shank 5 while passage 2' leads to a tube 16 angularly positioned within the shank 5 and screwed to the body.

The assemblage of tube 16 within the shank forms a feature of the invention, the arrangement is such that by simply screwing the parts together both ends of the shank and the formed end of the tube are seated gas tight. To effect this the opposite ends of the shank are threaded respectively to the body 1 and mixing chamber 6 and formed with perfectly smooth ends so as to make tight butt joints, while tube 16 is first screwed tightly into body 1 and provided at its outer end with an enlarged plug 17 tapered on its outside to fit in a tapered seat in member 6, and though the tube 16 extends at a slight angle within the tubular shank 5 this is immaterial as these two parts are quite long (about a foot) and the tube is resilient and its over-all length slightly longer than required so that it will be forced to bend slightly when the parts are screwed together.

Plug 17 is centrally drilled at 18 for the fuel gas passage and radially drilled at 19 to lead streams of oxygen or air around all sides of the fuel gas stream as it flows into the mixing chamber or nozzle 6 which is curved downward and slightly reduced interiorly at its outer end and formed with tapered walls 19.

The burner tip 7 screws in place over the nozzle so as to form a chamber 20 surrounding the end of the nozzle and is provided with a tapered bore 21 slightly larger at its upper end than the terminating end of the nozzle bore and is arranged to leave a slight annular space 22 through which the mixed gases may spread to chamber 20, while surrounding bore 21 are small holes 23 extending from chamber 20 to an annular recess 24 in the extreme end of the burner tip formed with an angular outer wall 25.

Space 22 may be adjusted by screwing the burner or tip 7 more or less on the nozzle but operates best when its total area equals about twenty per cent of the total area of holes 23.

In operation of the torch the main flame issuing from bore 21 is surrounded with small flames from holes 23, the small flames converging toward the main flame by reason of the angular drilling of these holes as well as through effect of the angular wall 25, while the inner wall 26 of the recess avoids disruptive action on the small flames by the main flame.

1

The torch described has been found particularly effective with natural gas and mixtures thereof which in ordinary torches are with difficulty kept ignited, whereas with the construction shown the flame may be controlled within all requirements and is kept in constant ignition.

Groove 27 around plug connecting with vent passage 28 is to provide escape for leakage and avoid accidental mixture of gases.

I claim:

1. In a gas torch of the character described including a valved body, nozzle mixing chamber, and tubular shank threaded at opposite ends respectively to said body and mixing chamber connecting the two and forming a gas passage from the valve to the mixing chamber, a tube within the shank connecting with a gas passage from the valve and extending angularly to and seating centrally in a bore in the mixing chamber.

2. In a gas torch of the character described including a valved body, nozzle mixing chamber, and tubular shank threaded at opposite ends respectively to said body and mixing chamber connecting the two and forming a gas passage from the valve to the mixing chamber, a tube within the shank connecting with a gas passage from the valve and extending angularly to and seating centrally in a bore in the mixing chamber, the seating end of said tube provided with a frusto-conical head ported to the tube and radially ported to the interior of the shank.

3. In a gas torch of the character described including a valved body, nozzle mixing chamber, and tubular shank connecting the two and forming a gas passage from the valve to the mixing chamber, a tube within the shank connecting with a gas passage from the valve and extending to and seating centrally in a bore in the mixing chamber, said shank being screwed to the body and nozzle members at both ends, and said tube screwed at one end to one of the members and seated in a taper seat in the other member.

4. In a gas torch of the character described including a valved body, nozzle mixing chamber, and tubular shank connecting the two and forming a gas passage from the valve to the mixing chamber, a tube within the shank connecting with a gas passage from the valve and extending to and seating centrally in a bore in the mixing chamber, said shank being screwed to the body and nozzle members at both ends, and said tube screwed at one end to one of the members and seated in a taper seat in the other member and being of a length to be compressed and slightly sprung when the parts are screwed together whereby the assemblage may be easily taken apart and put together by simply screwing the threaded members.

5. In a gas torch of the character described, a tubular nozzle having a mixing chamber, a tubular burner tip surrounding said nozzle having a central bore and spaced from the nozzle to provide an auxiliary mixing chamber around said nozzle communicating with its interior and having a plurality of relatively small holes each open at one end to said auxiliary mixing chamber and open at the opposite end at the outer end of the burner tip in an annular recess formed therein between inner and outer flanges thereon.

6. In a gas torch of the character described, a tubular nozzle with a central gas passage, a tubular burner tip screwed over the outside of said nozzle and providing a mixing chamber therearound, said burner tip having a main passage substantially coinciding with said central gas passage and a plurality of small passages around said main passage open at the end of the burner tip and to said mixing chamber, said burner tip having a shoulder forming with said tubular nozzle a restricted lateral passage from said central gas passage to said mixing chamber.

7. In a gas torch of the character described, a tubular nozzle with a central gas passage, a tubular burner tip screwed over the outside of said nozzle and providing a mixing chamber therearound, said burner tip having a main passage substantially coinciding with said central gas passage and a plurality of small passages around said main passage open at the end of the burner tip and to said mixing chamber, said burner tip having a shoulder forming with said tubular nozzle a restricted lateral passage from said central gas passage to said mixing chamber adjustable in its width of opening by screwing said burner tip along said nozzle.

8. In a gas torch of the character described, a tubular nozzle having a main central bore for the main flame and a plurality of small gas passages close to and surrounding the main passage opening into an annular recess formed in the outer end of said nozzle, said annular recess provided with an outer side wall extending at an angle to the axis of the main central bore whereby to converge streams of gas from said small holes into the stream issuing from the main bore.

LUDWIG W. STETTNER.